United States Defensive Publication [19] (H) [11] T100,701

Kuehn [43] Jun. 2, 1981

[54] IN-MOLD COATING COMPOSITIONS CONTAINING NON-FUNCTIONAL LIQUID COPOLYMERS AND FREE ISOCYANATE CONTAINING COMPOUNDS

[75] Inventor: Erich Kuehn, Wilmington, Del.

[73] Assignee: ICI Americas Inc.

[21] Appl. No.: 188,123

[22] Filed: Sep. 17, 1980

[51] Int. Cl.[3] ..... B32B 27/00

[52] U.S. Cl. ..... 428/422.8; 252/300; 427/133; 428/412; 428/413; 428/423.7; 428/425.6; 525/6

[57] ABSTRACT

Fully cured reinforced molded resins such as polyester, polyurea urethane, polyurea, polyurethane, polyisocyanurate, polyepoxy and polycarbonate resins can be in-mold coated to cover surface defects such as sink marks and microcracks with an improved coating composition comprising 5–94% by weight of an ethylenically unsaturated base resin free of groups reactive with isocyanate radicals; 5–94% by weight of an ethylenically unsaturated monomer free of groups reactive with isocyanate radicals and 1–20% by weight of isocyanate containing compounds or compounds which decompose to form free isocyanate containing compounds. Such coatings unexpectedly have improved adherence to molded articles over similar compositions which contain no free isocyanate. Such coatings exhibit excellent adhesion and when subjected to the standard adhesion test ASTM D3359-74 are graded from 3–5 and when subjected to the GM"X" adhesion test are graded from 8 through 10.

Typical formulations consist of 35% vinyl terminated polyester urethane resins, vinyl terminated polyisocyanurate resins, and vinyl terminated polyester resins all of which are free of groups reactive with isocyanate radical; 45% styrene; and 2–5% polyphenyl methane polyisocyanate having 2.7 —NCO groups per molecule with minor amounts of emulsifiers, fillers, catalysts, cross-linking agents, dryers and pigments. Such coatings when containing electroconductive fillers can be painted by standard electrostatic paint techniques.

6 Claims, No Sheets Drawing,

33 Pages Specification

The file of this unexamined application may be inspected and copies thereof may be purchased (849 O.G. 1221, Apr. 9, 1968).